(12) United States Patent
Caperan et al.

(10) Patent No.: US 6,224,652 B1
(45) Date of Patent: May 1, 2001

(54) METHOD AND DEVICE FOR THE AGGLOMERATION OF PARTICLES IN A GASEOUS FLOW

(75) Inventors: Philippe Caperan, Saint Jean le Vieux (FR); Joseph Somers; Karl Richter, both of Karlsruhe (DE)

(73) Assignee: European Atomic Energy Community (Euratom), Luxembourg (DE)

( * ) Notice: Subject to any disclaimer, the term of this patent is extended or adjusted under 35 U.S.C. 154(b) by 0 days.

(21) Appl. No.: 09/171,942

(22) PCT Filed: Apr. 14, 1997

(86) PCT No.: PCT/EP97/01867

§ 371 Date: Oct. 29, 1998

§ 102(e) Date: Oct. 29, 1998

(87) PCT Pub. No.: WO97/40921

PCT Pub. Date: Nov. 6, 1997

(30) Foreign Application Priority Data

Apr. 29, 1996 (LU) .......................................................... 88751

(51) Int. Cl.$^7$ .............................. B01D 51/08; B03C 3/00; B03C 7/00
(52) U.S. Cl. ......................... 95/29; 95/61; 95/62; 96/15; 96/17; 96/27; 96/60; 96/74; 96/77; 96/389; 96/413; 55/DIG. 25; 209/127.1
(58) Field of Search ...................... 55/DIG. 25; 96/15, 96/17, 60, 74, 389, 413, 27, 77; 95/29, 61, 62; 209/127.1

(56) References Cited

U.S. PATENT DOCUMENTS

| | | | |
|---|---|---|---|
| 2,535,679 | | 12/1950 | Horsley et al. . |
| 3,172,744 | * | 3/1965 | Fortman . |
| 3,755,122 | * | 8/1973 | Melcher .............................. 204/554 |
| 3,826,063 | * | 7/1974 | Festner ..................................... 96/73 |
| 4,169,714 | * | 10/1979 | Calvert . |
| 4,378,976 | | 4/1983 | Rush . |
| 4,649,703 | * | 3/1987 | Dettling et al. . |
| 4,765,803 | * | 8/1988 | Hirth . |
| 4,872,953 | * | 10/1989 | Smith . |
| 5,104,519 | * | 4/1992 | Haddad et al. . |
| 5,683,494 | * | 11/1997 | Altman et al. ........................... 95/55 |
| 5,695,549 | * | 12/1997 | Feldman .................................. 96/55 |
| 5,795,367 | * | 8/1998 | Kennedy et al. . |
| 5,827,350 | * | 10/1998 | Magill . |
| 5,885,330 | * | 3/1999 | Lee . |
| 6,004,375 | * | 12/1999 | Gutsch .................................... 95/57 |

FOREIGN PATENT DOCUMENTS 910 1116   5/1946   (FR) .

* cited by examiner

Primary Examiner—Chester T. Barry
(74) Attorney, Agent, or Firm—Sughrue, Mion, Zinn, Macpeak & Seas, PLLC

(57) ABSTRACT

This invention relates to a method and a device for agglomerating particles in a gaseous flow through an acoustical agglomeration chamber (3).

According to the invention a portion of the flow at the outlet of the chamber is selectively extracted by preferring larger particles, and is re-injected into the inlet of the chamber.

7 Claims, 1 Drawing Sheet

METHOD AND DEVICE FOR THE AGGLOMERATION OF PARTICLES IN A GASEOUS FLOW

BACKGROUND OF THE INVENTION

The invention refers to a method and a device for agglomerating particles in a gaseous flow through an acoustical agglomeration chamber.

Solid and liquid particles produced by different industrial processes and discharged to ambience by means of a gaseous flow constitute a source of pollution for nature and may be a risk for the health of men. In particular the submicron particle concentration in the atmosphere seems to be the cause of an increasing human disease rate. Thus the invention aims to conceive a method and a device which allows to reduce in particular the submicron particle rate in a gaseous flow before the latter is discharged to the atmosphere.

The state of the art comprises filters for gaseous flows which apply either electrostatic fields or mechanical processes (separators of the cyclone or venturi type) which are rather complex or ensure only a limited purification efficiency, especially if submicron particles are concerned. WO92/09354 describes an acoustical chamber ensuring an agglomeration of small particles thus allowing to collect thereafter the agglomerated particles by classical means conceived for larger size particles. In order to ensure efficiency, the transfer time of the particles through the acoustical chamber must be relatively long thus requiring a chamber of large dimensions and therefore a very high acoustical energy.

U.S. Pat. No. 2,535,679 discloses an agglomeration method for aerosol particles in an acoustical chamber according to which a portion of the outlet flow of the acoustical chamber is fed back to its inlet in order to increase the probability of collisions between particles of the aerosol.

A similar feed-back is also proposed in U.S. Pat. No. 4,378,976 but in this case a filtered flow is selected for the feedback which practically does not contain any more agglomerated particles.

SUMMARY OF INVENTION

The invention aims to propose a method and a device having an increased agglomeration efficiency and reduced dimensions.

This aim is achieved by the method as defined in claim 1 and by the device as defined in claim 4.

As far as preferred embodiments of the method and the device are concerned, reference is made to the secondary claims.

The invention will be described hereafter in more detail by means of an embodiment and the enclosed drawings.

DESCRIPTION OF THE PREFERRED EMBODIMENT

In any problem of particle separation the viscous forces must be overcome. If the particles are sufficiently small in size, these forces entrain the particles practically along the way of the gas flowing between these particles. Different forces may be used, either mechanical or electrical or magnetic etc., to overcome these viscous forces and to separate the particles from the gas.

In the frame of acoustical agglomeration of an aerosol, inertial effects are used by which the particles are differently entrained in the oscillatory gas movement. This favours collisions between particles by the inertial effect.

Hereafter the term "aerodynamic diameter" will be used which corresponds for any particle (soot flake, open particle aggregation, sand grain, droplet etc.) to the diameter of a water droplet setting down at the same speed as the respective particle. In general, this diameter differs from the geometrical size of the respective particle but it allows to compare with each other the inertial properties of particles of different nature.

The diameter $d_f$ of particles which are particularly submitted to the effect of an acoustical wave in an aerosol composed of particles having different aerodynamic diameters is given by the following equation: $d_f = \sqrt{9\mu/\rho\pi f}$; in this equation $\mu$ is the dynamic viscosity of the gas, $\rho$ is the density of water and f the acoustical frequency in international system units. By means of experimental tests it has been found that particles having an aerodynamic diameter below 1.5 $d_f$ (hereafter called "small" particles) become mutually agglomerated. On the other hand the agglomeration of small particles is accelerated by the presence of particles having an aerodynamic diameter above 1.5 $d_f$ (hereafter called "large" particles) to which the small particles aggregate.

Figure 1:
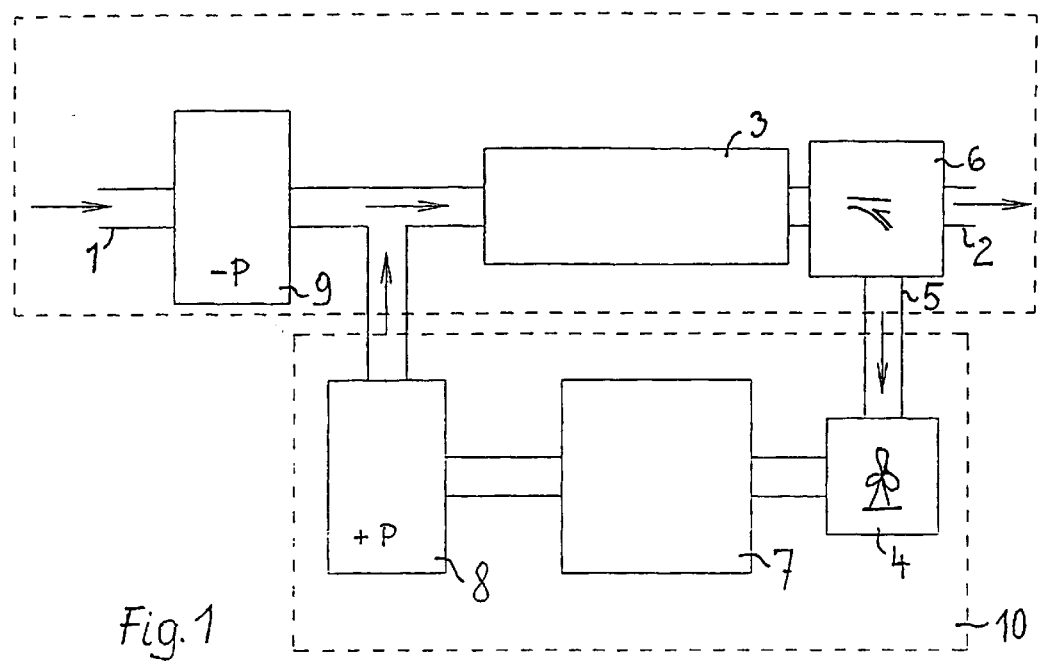
FIG. 1 schematically represents the device of this invention.

Referring to FIG. 1 which schematically represents the device according to the invention, the gaseous flow containing the particles is applied to an entry 1 and the flow exits via an outlet 2 from the device after having been processed. The essential element in view of the agglomeration is the chamber 3, which can be similar to that shown in WO92/09354. According to the invention, a feedback loop 10 is added which connects the outlet 2 to the inlet 1 of this chamber and contains a fan 4 allowing to extract a portion of the main flow from the outlet 2 and to re-inject it upstream of the chamber 3 into the main flow. Such a re-injection facilitates the initiation of the agglomeration by increasing the initial number of large particles per volume unit according to the above described effect. This loop thus ensures an effect similar to an agglomeration chamber which is considerably longer, that means which has a considerably longer transfer time, or similar to the injection of initiation particles of different nature (seed particles).

The feedback loop 10 is coupled to the outlet 2 downstream of the agglomeration chamber by means of an extraction unit which preferably acts as a separator giving preference to the extraction of large particles ($d > d_f$). This can be achieved either by a cyclone allowing the collection of large particles from a gaseous flow (having a low flow rate) in view of their re-injection, or by a virtual impactor as shown in FIGS. 2 or 3.

Figure 2:
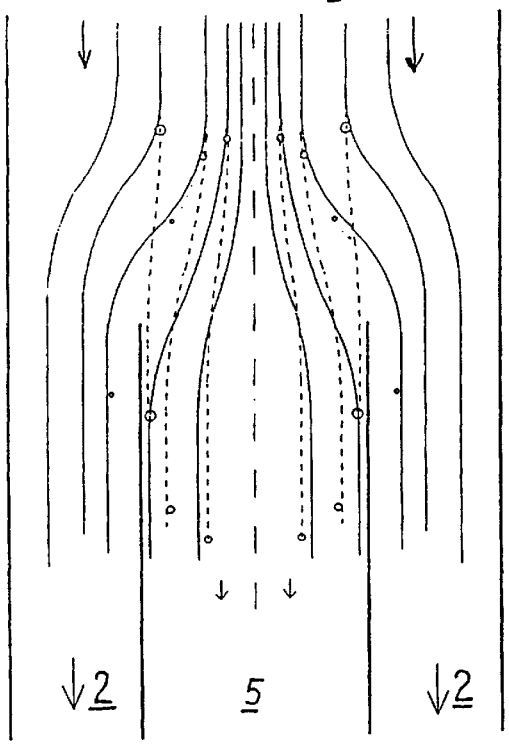
FIGS. 2 and 3 show two possible realisations of an extraction unit incorporated in the device of FIG. 1.

According to FIG. 2, the collection mouth 5 leading to the fan 4 is located in the centre of the main duct towards the outlet 2. The fan 4 ensures a flow speed in the feedback loop which at the level of the mouth 5 is lower than that of the main channel. The results therefrom are that the flow lines of the gas (continuous lines) become curved when approaching the mouth 5. Contrary thereto the larger particles tend, due to their inertia, to pursue their straight trajectory (interrupted lines). This difference results in a certain priority to large particles in the collecting mouth 5 with respect to the gaseous flow towards the outlet.

Figure 3:
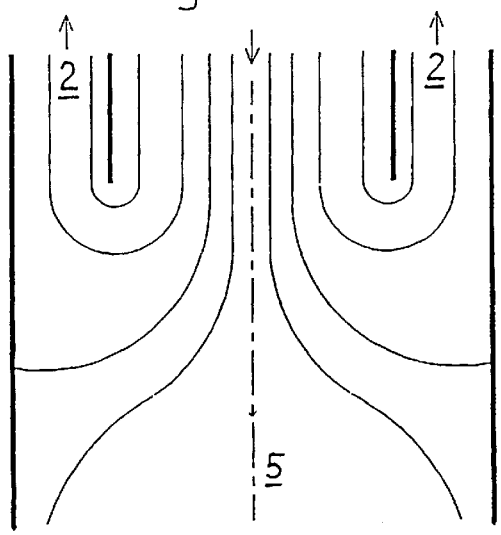

Another possibility of realisation of the separator 6 in FIG. 1 is shown in FIG. 3. This virtual impactor differs from the preceding one by the fact that the main flow between the agglomeration chamber 3 and the outlet 2 changes its direction, the flow lines being U-shaped.

According to a first embodiment of the invention the feedback loop is simply intended to inject large particles into the inlet of the agglomeration chamber which have already been created and selected to this end since the agglomeration effect is larger between particles of different aerodynamic diameters than between particles having similar aerodynamic diameters.

The feedback loop can further be used for an additional agglomeration of particles, for example in an additional acoustical chamber 7 downstream of the fan 4. This chamber can be provided with distinct acoustical sources or be acoustically coupled to the agglomeration chamber by selecting conveniently the acoustical impedance of the feedback loop.

According to yet another embodiment of the invention, an electrical charger 8 of a given polarity can be provided at the outlet of the feedback loop, and a charger 9 of opposite polarity at the main flow inlet 1. These chargers can, for example, consist of electrodes to which a very high positive or negative potential is applied with respect to the walls of the duct (connected to earth potential). These electrodes produce a corona effect. The particles thus charged positively or negatively tend to approach each other after injection of the flow coming from the feedback loop into the main flow. As the case may be, only one charger might be sufficient in the feedback loop if the main flow supplies charged particles to the agglomeration chamber.

Tests have shown that the agglomeration rate of small $TiO_2$ particles increases by a factor two (from 0.01 to 0.02 $S^{-1}$) if the density of large particles changes from 1000 to 5000 $cm^{-3}$. This demonstrates that without the feedback loop according to the invention the desired agglomeration for a flow having only small particles remains insufficient or requires a transfer time in the agglomeration chamber which is prohibitive in view of the size of the chamber.

The invention can be realised upstream of a classical filter which retains mostly large particles.

What is claimed is:

1. A method for agglomerating particles in a gaseous flow through an acoustical agglomeration chamber comprising the steps of extracting a portion of the flow at the outlet of the chamber by preferring larger particles, passing said portion through a feedback-loop containing a fan and reinjecting said large particles into the inlet of the chamber.

2. A method according to claim 1, where the extracted flow portion is submitted to an additional acoustical agglomeration processing prior to being re-injected to the chamber inlet.

3. A method according to claim 1, wherein the particles in the gaseous flow to be processed are electrically charged according to one polarity and the particles in the extracted flow portion are charged according to the opposite polarity prior to being re-injected into the chamber.

4. A device for agglomerating particles in a gaseous flow comprising: an acoustical agglomeration chamber, a feedback-loop provided which contains in series between an outlet and an inlet of the chamber, a separator which extracts preferably larger particles, and a fan allowing reinjection of the extracted flow back into the chamber.

5. A device according to claim 4, wherein the feedback loop further contains means for allowing an acoustical processing of an agglomeration of particles in said loop.

6. A device according to claim 4, wherein said feedback loop is acoustically coupled to the acoustical chamber.

7. A device according to claim 4, further comprising electrical chargers provided at the outlet of the feedback loop and/or at the inlet of the device in order to charge the particles to different polarities.

* * * * *